United States Patent [19]
Michalak et al.

[11] Patent Number: 5,658,547
[45] Date of Patent: Aug. 19, 1997

[54] SIMPLIFIED EFFICIENT PROCESS FOR REDUCING $NO_x$, $SO_x$, AND PARTICULATES

[75] Inventors: Stanislaw Michalak, Ratingen, Germany; Joseph R. Comparato; John E. Hofmann, both of Naperville, Ill.

[73] Assignee: Nalco Fuel Tech, Naperville, Ill.

[21] Appl. No.: 406,206

[22] Filed: Mar. 16, 1995

Related U.S. Application Data

[63] Continuation-in-part of Ser. No. 264,864, Jun. 30, 1994.

[51] Int. Cl.[6] ............................................. C01B 17/22
[52] U.S. Cl. .............................. 423/243.08; 423/243.01; 423/235; 110/345
[58] Field of Search .................... 423/235, 243.08, 423/243.01, 242.1; 110/345

[56] References Cited

U.S. PATENT DOCUMENTS

| | | | |
|---|---|---|---|
| 4,140,651 | 2/1979 | Burnell et al. | 252/188 |
| 4,440,100 | 4/1984 | Michelfelder et al. | 110/343 |
| 4,555,996 | 12/1985 | Torbov et al. | 110/345 |
| 4,719,092 | 1/1988 | Bowers | 423/235 |
| 4,731,233 | 3/1988 | Thompson et al. | 423/235 |
| 4,844,878 | 7/1989 | Epperly et al. | 423/235 |
| 4,869,885 | 9/1989 | Lin et al. | 423/242 |
| 4,877,591 | 10/1989 | Epperly et al. | 423/235 |
| 4,997,631 | 3/1991 | Hofmann et al. | 423/235 |
| 5,058,514 | 10/1991 | Mozes et al. | 110/345 |
| 5,468,460 | 11/1995 | Lin | 423/266 |

FOREIGN PATENT DOCUMENTS

| | | |
|---|---|---|
| 0373351 | 6/1990 | European Pat. Off. . |
| 2627880 | 11/1982 | Germany . |
| 9117814 | 11/1991 | WIPO . |
| 9202291 | 2/1992 | WIPO . |

*Primary Examiner*—Wayne Langel
*Assistant Examiner*—Amy M. Harding
*Attorney, Agent, or Firm*—St. Onge Steward Johnston & Reens LLC

[57] ABSTRACT

The removal of $SO_x$ and particulates, and preferably also $NO_x$, from the combustion gases of a large boiler, is simplified while efficiency is improved. In a primary treatment zone, a slurry comprising an alkaline $SO_x$-reducing composition and preferably a nitrogen-containing composition effective to reduce $NO_x$, is introduced into combustion gases at a temperature of from about 900° to about 1300° C. The gases are cooled by initial contact with steam-generating means, and then by contact with an gas-to-gas heat exchanger. Cooled gases are then subjected to a secondary treatment in which they are first humidified and further cooled by introduction of a water spray or aerosol to reduce the temperature to 100° C. or below. Contact between the $SO_x$-reducing composition and the humidified gases is maintained for a reaction period of at least 2 seconds. Particulate solids are then separated from the gases with a fabric filter. The cleaned gases are reheated by the gas-to-gas heat exchanger prior to discharge to the atmosphere. Reductions of $SO_x$ of greater than 80% are achieved, preferably 90 to 95%.

20 Claims, 3 Drawing Sheets

SIMPLIFIED EFFICIENT PROCESS FOR REDUCING $NO_x$, $SO_x$, AND PARTICULATES

RELATED APPLICATION

This application is a continuation in part of copending, commonly-owned U.S. patent application Ser. No. 08/264,864, pending, entitled "Multi-Step Process for Reducing $NO_x$ and $SO_x$", filed Jun. 30, 1994, by M. Linda Lin and John E. Hofmann.

TECHNICAL FIELD

The invention relates to a simplified process which is effective for reducing the gaseous pollutants sulfur oxides ($SO_x$), preferably also nitrogen oxides ($NO_x$), and particulates produced by combustion of carbonaceous fuels and waste. The invention has particular application to the reduction of these pollutants from coal-fired boilers, the chemical pollutant reductions being accomplished by in-furnace injection with improved efficiencies as compared to what is normally expected from processes of this type.

The combustion of carbonaceous fuels in large industrial and utility boilers and other power plants, produces nitrogen oxides ($NO_x$), sulfur oxides ($SO_x$) and solid particulates, commonly known as fly ash. The combustion of coal presents especially difficult problems due to the large amounts of the sulfur oxides and fly ash.

Effective removal of $SO_x$ has been most commonly associated with wet scrubbers which are relied upon to achieve reductions of 95% or more. Lesser reductions, typically less than about 85%, e.g., from about 30 to about 75%, have been achieved with various techniques for in-furnace injection of $SO_x$- reduction compositions, but these have not been relied upon where $SO_x$-reduction requirements are stringent. In order for the wet scrubbing procedures to be effective, they are generally preceded by removal of particulates by an electrostatic precipitator. Because of their high effectiveness, electrostatic precipitators have also been employed following in-furnace injection procedures—their effectiveness has even been improved by the introduction of urea for $NO_x$ reduction along with the $SO_x$-reduction composition.

The costs of wet scrubbers and electrostatic precipitators are often more than can be justified due to the age and productivity of many combustors. Yet, current technology employing other techniques has not been able to achieve the reductions necessary to justify the continued operation of plants that by nature of the fuels available (e.g., coal) are sites of excessive pollution.

There is a present need for an economical, efficient process for reducing the emission of gaseous pollutants and particulates which can eliminate the need for the costly and complex wet scrubbing and electrostatic precipitation techniques.

BACKGROUND ART

The technology for injecting calcium-based sorbents directly into furnaces to contact high-temperature combustion gases to remove $SO_x$ has employed the use of a variety of reagents, physical means to achieve contact between the pollutants and the reagents, and downstream treatment of the effluent to remove ash and spent reagent. As noted above, the use of wet scrubbers and electrostatic precipitators have been found to be highly effective, but not economically justifiable in many circumstances. Similarly, fluidized beds are effective but costly. It is generally understood that lesser technologies such as in-furnace injection cannot be sufficiently effective to be competitive.

Various "sorbent injection" techniques have been proposed for introducing $SO_x$ sorbents such as lime, limestone and dolomite. These techniques are economically attractive from a capital standpoint in many situations where existing combusters must be cleaned up. However, as currently operated, they need improvement in effectiveness. The idea of sorbent injection is to introduce a suitable sorbent in essentially dry form to react with the $SO_x$ and then collect the spent sorbent by conventional particulate recovery means such as electrostatic precipitation or fabric filters. It has generally been understood that the sorbents should be in chemically-hydrated form, but have been introduced dry, wet, with the fuel, with the combustion air, and at various stages downstream of the primary combustion zone.

One example of dry sorbent injection, is disclosed by Mitchfelder, et al., in U.S. Pat. No. 4,440,100, where they describe introducing the sorbent into a combustor below the burners. Techniques of this type are criticized by Torbov, et al., in U.S. Pat. No. 4,555,996, which indicates that the reaction only occurs within the narrow temperature window of from 1800° to about 2200° F. Torbov, et al. provide data ($SO_x$ reductions of from 22.6 to 72.5%) to show that injecting calcium compounds as slurries is better than injecting the compounds dry form, because the dry form is often rendered inactive when introduced into furnaces at temperatures above about 2200° F. No reaction beyond the indicated temperature zone is identified, and no discussion of particulate recovery is presented.

In European published patent application No. 373,351, DeMichele and Quattroni discuss the use of a mixture of urea, hydrate lime and water in conjunction with an electrostatic precipitator to reduce nitric oxide and sulfur anhydrides. It is indicated that, when the lime concentration is greater than or equal to 35% of the dispersion, a polysaccharide and ligninsulfonate dispersing agent is employed. The key advantage of their process is said to be the improvement in the operation of electrostatic precipitators which is attributed to the use of the urea and lime in aqueous slurry.

The use of slurries is also described by Thompson and Muzio in U.S. Pat. No. 4,731,233. There, the inventors indicate that the use of the slurry with excess water is not the controlling criteria, but it is important to fully hydrate the sorbent prior to introducing it either wet or dry. Their results ($SO_x$ reductions of from 22 to 34%) were obtained on a pilot plant unit and they did not investigate reaction downstream of the primary reaction zone or the advantage of any particular means of particulate collection.

In U.S. Pat. No. 5,058,514, Mozes, Mangal, and Thampi disclose a slurry injection process for $SO_2$ and $NO_x$ reduction using calcium carbonate and a nitrogenous progenitor such as urea. They reported results of a pilot plant coal burner equipped with an electrostatic precipitator. No interaction was found between the $SO_x$ and $NO_x$ reducing agents. The disclosed advantage is the independent activity of the components—i.e., no loss of activity as compared with independent use of the components. No downstream $SO_x$ reduction was identified.

There is a present need for an economical and efficient process to retrofit existing power plants, especially those burning coal, which provides pollution reductions similar to those achieved using wet scrubbing for $SO_x$ reduction and electrostatic precipitation for particulate removal.

DISCLOSURE OF INVENTION

It is an object of the invention to achieve effective $SO_x$ reduction, preferably in conjunction with $NO_x$ reduction, without requiring either wet scrubbing for $SO_x$ reduction or electrostatic precipitation for particulate removal.

It is another object of the invention to enhance the $SO_x$ reduction available from conventional sorbent injection techniques by providing an overall process, preferably including $NO_x$ reduction, which achieves not only high percentage $SO_x$ reductions, but also achieves high sorbent utilization.

It is a still further object of the invention to so enhance $SO_x$ reduction from existing coal-fired combustors by utilizing sorbent injection techniques in an overall process, preferably including $NO_x$ reduction, that cost-effective pollution control can be brought to economies which cannot afford to replace large numbers of existing power plant units or to retrofit them with wet scrubbers and the like.

These and other objects are accomplished by the invention which provides a process for removing $SO_x$ and particulates, and preferably also $NO_x$, from the combustion gases of a large, preferably coal-fired, combustor. According to the process, a slurry is prepared, preferably with stabilizers effective to maintain long-term stability. The slurry comprises an alkaline $SO_x$-reducing composition (sorbent) and, also preferably, a nitrogen-containing composition (especially, urea or a urea hydrolysate or its components) effective to reduce $NO_x$, both effective within a defined temperature range.

At least one treatment zone is selected within the combustor, having a temperature within the defined temperature range. This is a primary treatment zone and is important not only for its ability to reduce $SO_x$, generally, and $NO_x$, if desired, but for its ability to reduce the concentration of $SO_3$ to a level which will permit effective secondary treatment as will be described below. If desired, more than one location can be selected and used to achieve this primary treatment. The slurry is introduced into the hot combustion gases, preferably at a combustion gas temperature of from about 900° to about 1300° C., within the treatment zone. The conditions are controlled to reduce the $SO_3$ concentration to less than about miligram (mg) per cubic meter. The gases are cooled by initial contact with heat exchange means for heating water, such as for steam-generation, and then optionally by contact with an gas-to-gas heat exchanger.

Cooled gases are then passed to a secondary treatment zone wherein they are first humidified and further cooled by introduction of a water spray or aerosol, preferably to reduce the temperature to 100° C. or below. The temperature to which the gasses can be cooled by the combination of gas-to-gas heat exchange and humidification, depends on the degree to which the $SO_3$ has been removed in the primary treatment zone. Contact between the $SO_x$-reducing composition and the humidified gases is maintained during flow of the gases, carrying the $SO_x$-reducing composition, through a suitable passage for a reaction period of at least 2 seconds. Particulate solids are then separated from the gases by passing the gases through a fabric filter which captures the particulate solids. The combustion gases contact particulate solids carried on the fabric filter to provide further contact between the $SO_x$ in the gases and the sorbent. The cleaned gases are reheated, as necessary, by the gas-to-gas heat exchanger prior to discharge to the atmosphere. The solids are recovered from the fabric filter at a rate effective to provide capacity for incoming particulates that it must separate from the combustion gases. Preferably, a portion of the solids is recycled to the process, preferably just following the humidification step, to improve sorbent utilization.

Reductions of $SO_x$ of greater than 80% are achieved, preferably 90 to 95%. In addition, very high reductions in $SO_x$ can be facilitated by the addition of fresh sorbent, such as hydrated lime, to the solids recycle stream.

BRIEF DESCRIPTION OF THE DRAWINGS

The invention will be better understood and its advantages will become more apparent in view of the following detailed description, especially when read with reference to the appended drawings wherein.

INDUSTRIAL APPLICABILITY

Figure 1:
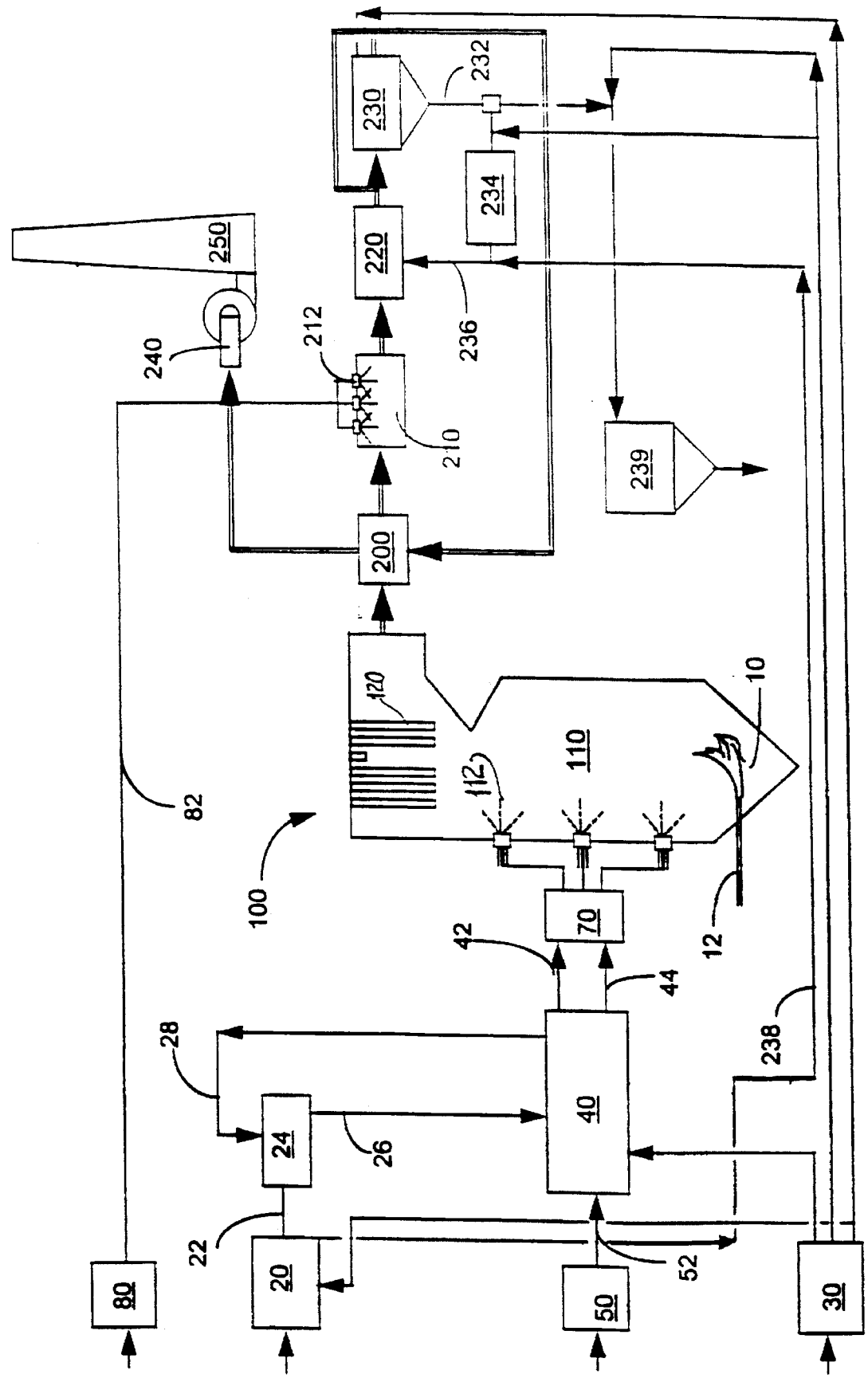
FIG. 1 is a schematic illustration of an integrated system according to the present invention for reducing $SO_x$ and particulates.
Figure 2:
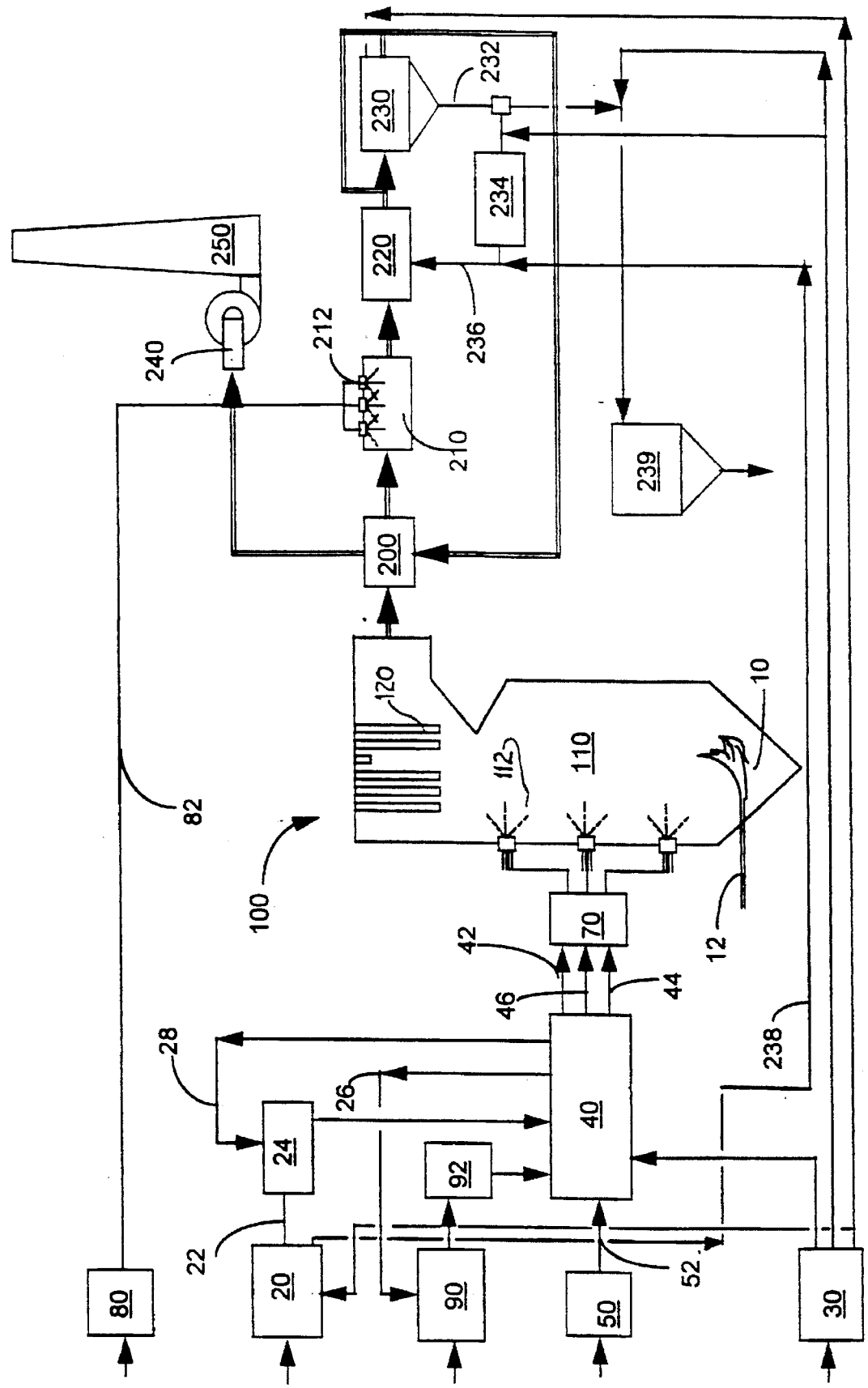
FIG. 2 is a schematic illustration of an integrated system similar to that shown in FIG. 1, which also provides for $NO_x$ reduction.

Two typical installations of the invention are illustrated in the attached Figures, in which FIG. 1 shows $SO_x$ reduction and FIG. 2 adds $NO_x$ reduction. In both, a boiler 100 comprises a flame zone 10 wherein a fuel 12 is burned with air to form hot combustion gases which contain the gaseous pollutants $NO_x$ and $SO_x$, as well as particulate solids such as fly ash. The drawings are not meant to depict any particular fuel source, although the invention is particularly well adapted to use in coal-fired combustors. While the advantages may be the greatest in these types of operations, the invention is by no means limited to them. Effluents from the combustion of all types of carbonaceous materials can be treated, also including natural gas, synthetic gas, fuel oils, bitumens and residual fuel oils, domestic and industrial solid or other combustible waste, and the like.

The hot combustion gases, also sometimes referred to as the effluent, travel from flame zone 10 through primary treatment zone 110 and then through the rest of the system (the flow depicted by the double-lined arrows). An gas-to-gas heat exchanger 200 precedes the secondary treatment zone which includes as essential elements cooling and humidification unit 210, reaction zone 220 and fabric filter 230. The heat exchanger 200 serves the dual function of initially cooling the combustion gases before entry into the secondary treatment zone and transfers the heat therefrom to the cleaned gases just before discharge by fan 240 and stack 250.

To the left of the combustor 100 in the Figures is an apparatus for preparing and introducing a slurry of a $SO_x$-reducing composition and, preferably, in the embodiment of FIG. 2, a suitable $NO_x$-reducing composition into the primary treatment zone 110.

The process illustrated in FIG. 1 employs a single treatment agent in the form of an aqueous slurry, containing a suspension of a finely-divided, preferably stabilized, alkaline $SO_x$-reducing composition.

The suspension of a finely-divided alkaline $SO_x$-reducing composition preferably includes at least one material selected from the group consisting of the oxides, hydroxides, and carbonates of an alkali metal or alkaline earth metal (preferably, a hydroxide or carbonate of magnesium or calcium). The inexpensive mineral forms of these materials are preferred. Many calcium and magnesium-based sorbents for $SO_x$ reduction are known, including lime, calcium carbonate, magnesium carbonate, calcium hydroxide, magnesium hydroxide, and mixtures thereof, such as in the common mineral forms of limestone, dolomite, and other forms of calcium or magnesium carbonates including oyster shells, aragonite, calcite, chalk, marble, marl, and travertine. Dolomite is a preferred form including magnesium carbonate. Limestone is the preferred form of calcium carbonate but can be replaced with another form of alkaline calcium, e.g., lime hydrate, if desired. It can be mined or manufactured. In this description, the terms calcium carbonate and limestone are used interchangeably. Mixtures are specifically intended.

To stabilize the slurries for simplified and efficient operation it is preferred to use a suitable stabilizer, such as those disclosed in copending application U.S. Ser. No. 08/179, 447, filed Jan. 10, 1994, by M. L. Lin, the disclosure of which is hereby incorporated by reference. Among the preferred stabilizer systems are those comprising a generally hydrophobic surfactant having an HLB of less than about 10 and a more hydrophilic surfactant having an HLB of at least about 10, wherein the HLB values of the hydrophobic and the hydrophilic surfactants differ by at least about 3, preferably at least about 5. The ratio of the weight of the hydrophobic dispersant to the weight of the hydrophilic dispersant is preferably within the range of from about 25:1 to about 1:1, e.g. from about 12:1 to about 2:1. The dispersant system is typically employed at a concentration of from about 1 to about 20,000 parts per million w/v (ppm), and preferably from about 250 to about 1,000 ppm.

Preferred hydrophobic dispersants (HLB values of less than 8) are materials selected from the group consisting of ethoxylated phenol ethanol, block polymers of ethylene oxide and propylene oxide, petroleum sulfonates, organo phosphate esters, fatty acids such as oleic acid, castor oil, alkyl sulfonates, fatty acid alkanolamides, and mixtures of any two or more of these. Preferred hydrophilic dispersants are materials selected from the group consisting of alkanolamides, lauryl sulfate salts, dodecyl benzene sulfonates, amide sulfonates, phosphate esters, and mixtures of any two or more of these.

The amount of calcium or like sorbent in the composition can be varied depending upon the amount of $SO_x$ in the effluent and the amount of the nitrogenous treatment agent in the composition. Preferably, the calcium or like sorbent will be included in the composition at a molar ratio of calcium to baseline (that is, pre-treatment level of) $SO_x$ of about 1:2 to about 4:1, more preferably about 1:1 to about 3:1. This ratio is also referred to as the calcium to sulfur ratio. In general, sorbent will comprise at least about 10% of the slurry and preferably between about 15% and about 50%.

Referring again to the Figures, the sorbent raw material, e.g., limestone is held in silo 20 and then fed from there via line 22 to slurry preparation and hold tank 24, wherein it is mixed with water and the various additive materials referred to above to provide suitable slurry stability and reactivity. The sorbent material is preferably ground prior to slurrying to an average particle size of from about 1 to about 20 μ, weight average.

The sorbent material is conveyed, preferably by a pneumatic system using air from compressor station 30 supplied via line 32 at a suitable pressure and volume to fluidize the sorbent and convey it. In the exemplary situation where the sorbent is limestone ground to an average particle size of about 10 μ, weight average, a pressure of from about 0.8 to about 1 bar is effective. The slurry in tank 24 is fed continuously via line 26 to metering and pumping module system 40 and returned, also continuously, via line 28. This continuous circulation of the slurry helps maintain suspension of the solids in the slurry. Any water required for final dilution is supplied from station 50 via line 52 to metering and pumping module system 40. The water from station 50 is relatively low in pressure, e.g., about 6 bar, as compared to that from station 60, about 30 bar, as will be discussed later in connection with the secondary treatment.

At least one introduction location comprised in a primary treatment zone 110 is selected within the combustor 100, having a temperature within a defined temperature range, preferably at a combustion gas temperature of from about 900° to about 1300° C. This is determined by studying the temperature distributions within the combustor 100 under a number of different load conditions, and utilizing the information developed to identify the location of the treatment zone 110 and the exact location of injectors 112 within it. This information is also employed as part of a computer model to vary injection parameters in response to measured values of load and pollutant emissions.

The primary treatment zone 110 can, if desired, include more than one injection location to achieve primary treatment by contact of the $SO_x$-containing combustion gases with the $SO_x$ sorbent. This primary treatment zone is important for several reasons. First, the contact of the combustion gases with the sorbent immediately achieve significant reductions in $SO_x$ concentrations generally (and $NO_x$ in the embodiment of FIG. 2). But also, and very importantly, it reduces the concentration of $SO_3$ to a level which will permit effective secondary treatment as will be described below. The conditions within the primary treatment zone are desirably controlled to reduce the $SO_3$ concentration to less than about 10 mg per cubic meter.

The slurry is introduced into the hot combustion gases within the treatment zone by pumping the slurry, with any additional water, as noted from metering and pumping module 40 to distribution module 70 which feeds the slurry as designated by the control system noted to one or more sets of injectors 112. The preferred form of the invention also supplies air under pressure, e.g., about 6 to 7 bar, and preferably with a dew point of 3° C.

Because of the need for uniform distribution of the slurry throughout the desired cross-sectional planes of the effluent for effective pollutant reduction, the nozzles must be chosen to be effective for this purpose. It is an advantage for the invention that air-atomized nozzles can be effectively utilized to introduce the treatment slurry, containing either $SO_x$-reducing composition alone or in combination with a $NO_x$-reducing composition—both varied as process control demands. Given the finding of the invention that such air-atomized nozzles are effective, the skilled artisan will recognize that certain conventional nozzles would be effective for this purpose.

Suitable individual nozzles for injection of the aqueous slurry include Turbotak® nozzles. Additional nozzles which may be suitable are described in International Pat. Application entitled "Process and Apparatus for Minimizing Pollutant Concentrations in Combustion Gases", having Application No. PCT/EP91/00952, filed in the names of Chawla, von Bergmann, and Pachaly, on May 21, 1991 and West German Pat. DE-26 27 880 C2, published 11 Nov. 1982, the disclosures of each of which are incorporated herein by reference.

It is possible that, under certain circumstances, the amount of water or other diluent in the slurry can have a "quenching" effect on the sorbent and nitrogenous agent. That is, the time it takes to evaporate the diluent can delay effect of the treatment chemicals until treatment is occurring at a lower temperature than initially desired. This may occur (although not necessarily) when the solids levels in the slurry are below about 40%, more particularly below about 25% by weight.

The gases leaving the primary treatment zone 110 are cooled by initial contact with heat exchange means 120 utilized to heat water for use as such or for steam-generation, and then, preferably, by contact with an gas-to-gas heat exchanger 200.

Cooled gases are then passed to a secondary treatment zone (as noted above, comprised of at least humidification zone 210, reaction zone 220 and fabric filter 230). In the first stage of the secondary treatment zone, the gases are humidified and further cooled by introduction of a water spray or aerosol, such as by means of spray nozzles 212 which achieve a spray of from about 10 to about 50 μ, weight average, median diameter. Water to the nozzles is shown to be supplied from module 80 via line 82, preferably at a pressure of from about 20 to 40 bar, e.g., about 30 bar. Alternatively, such water spray can be created a lowered pressure, about 3 to 6 bar, using air-atomized nozzles.

The water spray is preferably added at a rate sufficient to reduce the temperature of the gases to 100° C. or below. The temperature to which the gasses can be cooled at this point depends on the degree to which the $SO_3$ has been removed in the primary treatment zone and the saturation temperature (dew point) of the gas stream. In the exemplary situation where the $SO_3$ concentration is reduced to less than 10 mg per cubic meter, the temperature is desirably reduced to below 100° C. and the humidity of the gases is increased to within the range of from 50 to 95%. More preferably, the concentration of $SO_3$ is reduced to below 5 mg per cubic meter in the primary treatment zone and the step of cooling and humidifying the gases to produce humidified gases, reduces the temperature of the gases to from 65° to 80° C.

Contact between the $SO_x$-reducing composition and the humidified gases is maintained during flow of the gases and the $SO_x$-reducing composition through a reaction zone 220. The reaction zone can comprise any suitable passage, such as conventional ducting, provided it allows for an effective reaction period, e.g., of at least 2 seconds, and preferably from about 4 to about 10 seconds.

Particulate solids, which comprise at least fly ash, spent sorbent and still-reactive sorbent, are then separated from the gases by passing the gases through a fabric filter 230 which captures the particulate solids. As the solids are captured on the filter, a layer is built up—basically forming a reactive bed, the effectiveness of which is increased by the ability of the invention to create a sorbent with enhanced reactivity arising from injection in the form of a slurry and to humidify and cool the gases as noted above. The combustion gases contact particulate solids carried on the fabric filter to provide further contact between the $SO_x$ in the gases and the sorbent.

The cleaned gases are reheated by the gas-to-gas heat exchanger 200 prior to discharge to the atmosphere by means of fan 240 and stack 250.

The solids are recovered from the fabric filter at a rate effective to provide capacity for particulates it must separate from the combustion gases. Preferably, a portion of the solids is recycled to the process via line 232, recycle silo 234, line 236 and control valving not shown, to improve sorbent utilization. The recycle stream 236 preferably renters the process just following the humidification step, but sit may be desirable in some embodiments cause it to renter the process prior to humidification or another location. Reductions of $SO_x$ of greater than 80% are achieved, preferably 90 to 95%. Alternatively, to further enhance $SO_x$ reduction, additional fresh sorbent (e.g., containing solids amounting to from about 20% to about 80% of the weight of the recycled solids), preferably dry, may be added to the solids recycle stream via line 238, either before or after the silo 234. Spent sorbent is sent to storage silo 239 to await disposal.

Referring now to the embodiment of FIG. 2 wherein a $NO_x$-reducing composition is employed. The $NO_x$-reducing composition will be one effective for non-catalytic reduction of nitrogen oxides. This process comprises a selective, free radical-mediated process, often referred to as selective non-catalytic reduction (SNCR).

Storage tank 90 provides a concentrated $NO_x$ reducing composition which is used to form the slurry at the correct concentration. From storage, the concentrated composition is preferably fed to a day tank 92, as needed. From the day tank, the composition is fed to metering and pumping module 40 which sends it in the amount required to distribution module 70 wherein it is mixed with the slurry and fed to injectors 112 for introduction as a comboined slurry, preferably by air atomization.

The nitrogenous treatment agent is preferably added to the slurry in a ratio of the nitrogen in the treatment agent to the baseline (i.e., pre-treatment) effluent nitrogen oxides level which can vary between about 0.5 and about 3.5. This ratio can be referred to as the "normalized stoichiometric ratio" or "NSR". "Normalized stoichiometric ratio" refers to the ratio of the concentration of reducing-radicals such as $NH_x$ radicals ($NH_x$ radicals, with x being an integer, are believed to be the moiety contributed by the treatment agent which facilitates the series of reactions resulting in $NO_x$ reduction to $N_2$) to the concentration of nitrogen oxides in the effluent and can be expressed as $[NH_x]/[NO_x]$. Alternatively, the molar ratio of the treatment agent to the $NO_x$ concentration can be used in place of NSR when the chemistry of reduction is not well defined; the term NSR as used herein will also be understood to encompass molar ratio when appropriate.

Advantageously, the nitrogenous treatment agent is included in an amount of about 3% to about 35% by weight of the total composition, excluding diluent (i.e., water) and about 1% to about 15% of the final slurry.

Generally, the weight ratio of sorbent to nitrogenous agent in the final slurry will be about 1.5:1 to about 33:1, more preferably about 2.7:1 to about 22:1. Besides the nitrogenous agent and the sorbent, the remainder of the composition comprises water or other diluent sufficient to form a slurry.

Generally, the slurry comprises about 15% to about 70% solids by weight, preferably about 20% to about 50% solids by weight.

Various NH-containing compositions, in their pure and typical commercial forms, will generate effective gas phase agents (e.g., the amidozine radical, a free radical consisting of nitrogen and hydrogen, NH·) when introduced in aqueous solution and subjected to elevated temperatures. Among the prominent NH-containing compositions are those selected from the group consisting of ammonia, ammonia precursors (materials which when heated or dissolve in water give off ammonia), urea, urea precursors (materials which when heated or dissolved in water yield urea), urea hydrolysis products (such as ammonium carbamate, ammonium carbonate, ammonium bicarbonate, and ammonium hydroxide), products of reaction of urea with itself or other compositions, related compositions, and mixtures of these.

Among these compounds are other ammonium salts (inorganic and organic) particularly of organic acids (e.g., ammonium formate, ammonium citrate, ammonium acetate, ammonium oxalate), various stable amines, guanidine, guanidine carbonate, biguanide, guanylurea sulfate, melamine, dicyanimide, calcium cyanamide, biuret, 1,1' azobisformamide, methylol urea, methylol urea-urea, dimethyl urea, hexamethylenetetramine (HMTA), and mixtures of these.

Among the hydrolysis products are ammonia, ammonium hydroxide, carbamates such as ammonium carbamate, ammonium carbonate, ammonium bicarbonate and other ammonia salts, various urea complexes and half ammonia salts. The exact form of some of these compounds is not known because the techniques employed to analyze them can affect their makeup. U.S. Pat. No. 4,997,631 to Hofmann, et al. and PCT application WO 92/02291 to von Harpe, et al., are incorporated herein by reference.

Where the nature of the process calls for it, one or more enhancers can be employed. Enhancers are additive materials which modify the effectiveness of a pollutant-reducing agent in terms of its effective temperature window, its utilization efficiency, or the like. Among the enhancers are the above materials when used in suitable combination, oxygenated hydrocarbons, and mixtures of these. Exemplary of the oxygenated hydrocarbons are ketones, aldehydes, alcohols including polyols, carboxylic acids, sugars, starch hydrolysates, hydrogenated starch hydrolysates, sugar-containing residues such as molasses, and mixtures of any of these. The entire disclosures of U.S. Pat. Nos. 4,719,092, 4,844,878 and 4,877,591 are incorporated herein by reference.

While the preferred embodiment of the invention combines $NO_x$ and $SO_x$ reducing compositions into a single component, it is understood that situations may exist where it is is preferable to inject the $NO_x$ and $SO_x$ reducing compositions into separate zones in a furnace. Such a situation could exist where the preferred temperature for reduction of $SO_x$ is in the upper end of the 900° to 1300° C. temperature range whereas the preferred temperature for reduction is in the lower end of the 900° to 1300° C. range. In such a case, the two reagents are injected through independent injection systems and not comingled in module 70 as shown in FIG. 2.

The following examples are provided to further explain and illustrate the invention and some of its advantages, but are not to be taken as limiting in any regard. Unless otherwise indicated, all percentages are by weight.

EXAMPLE 1

A spreader-stoker is operated for the production of hot water. The unit is fired with bituminous coal containing about 0.9% sulfur by weight. The boiler is being operated at a thermal input of 140 Gj/hour. Baseline emissions with no treatment were 2,300 mg/$Nm^3$ (dry @ 7% $O_2$) for $SO_2$ and 600 mg/$Nm^3$ (dry @ 7% $O_2$) for $NO_x$.

After establishing baseline conditions, injection of aqueous solution containing 44.5 kg/hour of urea was commenced. At the same time, injection of a slurry of hydrated lime was also commenced. The quantity of hydrated lime $(Ca(OH)_2)$ was about 275 kg/hour. In other runs, the solution and slurry were combined for injection as a single slurry.

Approximately 5% of the total flue gas flow (equivalent to about 3,000 $Nm^3$/hour) after the economizer was diverted through a humidification zone and a bag filter. The temperature of the gas entering the humidification zone was approximately 120° C. Water was then injected into the humidification zone to reduce the flue gas temperature to the range of 70° to 80° C. The gas then passed through a reaction one with a residence time of about 3 to 4 seconds. Following the reaction zone, the gas passed through a fabric filter with a total surface area of about 14.7 square meters.

The emissions of $SO_2$ and $NO_x$ were measured at the exit from the fabric filter. The $NO_x$ concentration was essentially constant and independent of the gas temperature after humidification. After correction to dry conditions and 7% $O_2$, the $NO_x$ concentration averaged about 235 mg/$Nm^3$. This represents a reduction of 61% from untreated baseline conditions.

Emissions of $SO_2$ were found to average about 200 mg/$Nm^3$ for conditions where the gas temperature in the fabric filter was in the range of 70° to 75° C. An $SO_2$ concentration of 200 mg/$Nm^3$ represents over 90% reduction from the original baseline of 2,300 mg/$Nm^3$.

EXAMPLE 2

A similar, but somewhat smaller, steam-generating soker-fired boiler was fire with the same coal as in Example 1. Total heat input for this test averaged about 67 Gj/hour. The baseline or untreated concentration of $SO_2$ in the flue fas for this boiler was 2,060 mg/$Nm^3$ (dry @ 7% $O_2$), or 766 grams/Gj.

A portion of the flue gas, approximately 4,000 $Nm^3$/hour was withdrawn after the economizer and diverted to the same humidification reactor and fabric filter described in Example 1. A slurry of lime hydrate was then injected into the furnace at the rate of about 120 kg of lime hydrate per hour.

Figure 3:
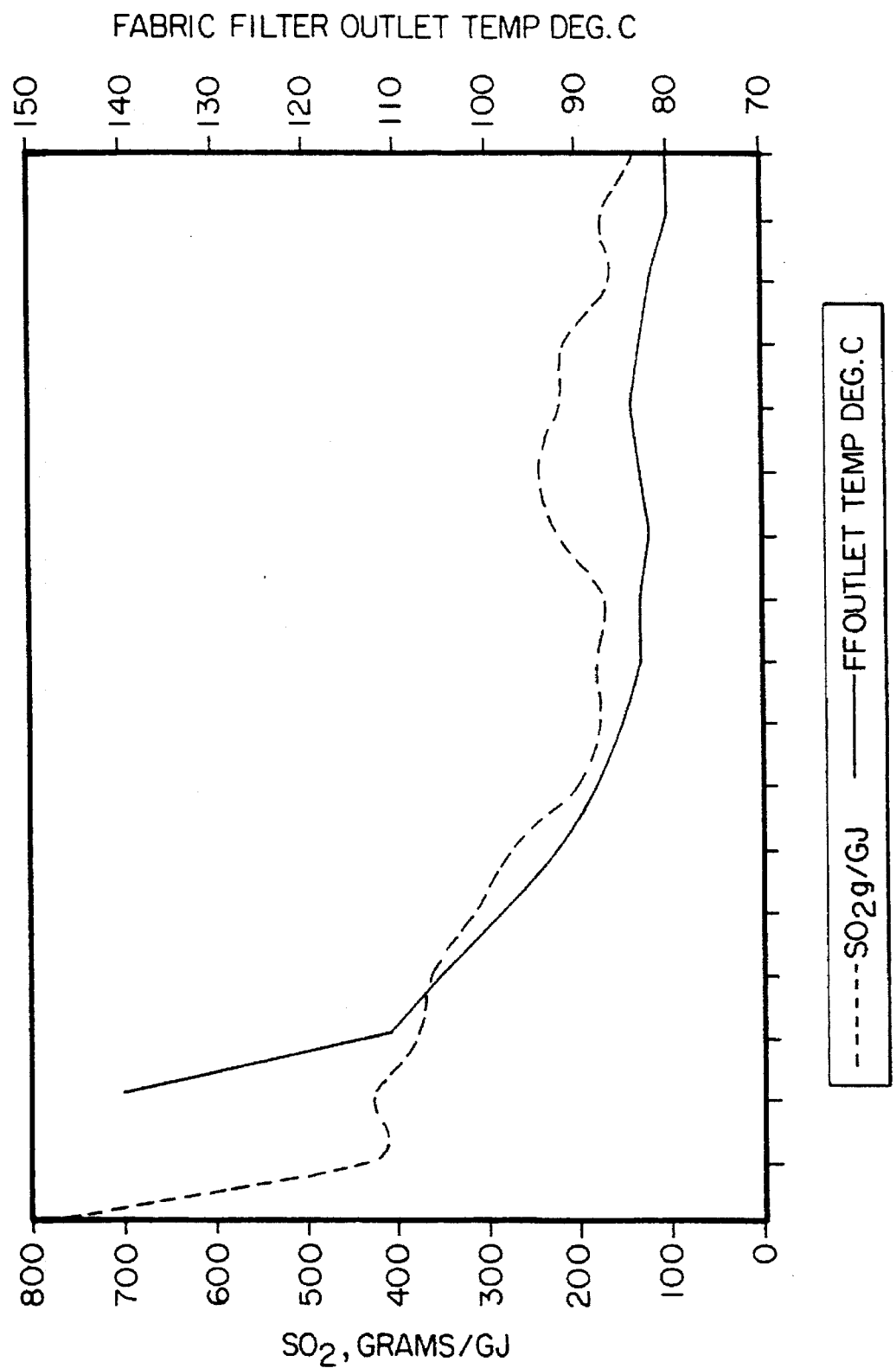
FIG. 3 graphically depicts the results of Example 2.

Water was then added to the humidification reactor in an amount sufficient to reduce the flue gas temperature from about 150° C. down to about 80° C. The results of a total of eighteen test runs are shown in FIG. 3 each mark along the abcissa indicating a run for which $SO_2$ and fabric filter outlet temperature are reported. The concentration of $SO_2$, expressed in terms of grams/Gj, is shown to fall as the fabric filter outlet temperature reaches 80° C. This represents a reduction from the original $SO_2$ baseline of about 75%.

The above description is for the purpose of teaching the person of ordinary skill in the art how to practice the present invention and it is not intended to detail all of those obvious modifications and variations of it which will become apparent to the skilled worker upon reading the description. It is intended, however, that all such obvious modifications and variations be included within the scope of the present invention which is defined by the following claims. The claims are meant to cover the claimed elements and steps in any arrangement or sequence which is effective to meet the objectives there intended, unless the context specifically indicates the contrary.

We claim:

1. A process for removing $SO_x$ and particulates from the combustion gases of a combustor, comprising:

preparing a slurry of an alkaline $SO_x$-reducing composition effective to reduce $SO_x$ within a defined temperature range;

defining a primary treatment zone including at least one treatment zone, having a temperature within the defined temperature range, within the combustor;

introducing the slurry into the combustion gases within the primary treatment zone, the conditions being controlled to reduce the $SO_3$ concentration to less than 10 miligrams per cubic meter;

cooling the combustion gases;

passing the cooled gases to a secondary treatment zone wherein they are first humidified and further cooled by introduction of water to produce humidified gases;

maintaining contact between the $SO_x$-reducing composition and the humidified gases for a reaction period of at least 2 seconds;

passing the gases through a fabric filter to remove particulate solids and provide contact between the gases and particulate solids held thereon to provide cleaned gasses.

2. A process according to claim 1 wherein the gases leaving the primary treatment zone are cooled first by water heating means and then by a gas-to-gas heat exchanger.

3. A process according to claim 2 wherein the cleaned gases are reheated by the gas-to-gas heat exchanger prior to discharge to the atmosphere.

4. A process according to claim 1 wherein the step of cooling and humidifying the gases to produce humidified gases, reduces the temperature of the gases to below 100° C. and increases the relative humidity of the gases to within the range of from 50 to 95%.

5. A process according to claim 4 wherein the step of cooling and humidifying the gases to produce humidified gases, reduces the temperature of the gases to from 65° to 80° C.

6. A process according to claim 1 wherein solids are recovered from the fabric filter at a rate effective to provide capacity for particulates it must separate from the combustion gases, and a portion of the solids is recycled to the process.

7. A process of claim 1 wherein the composition comprises a stabilizer system comprising a hydrophobic surfactant having an HLB of less than 8 and a more hydrophilic surfactant having an HLB of at least 8, wherein the HLB values of the hydrophobic and the hydrophilic surfactants differ by at least 3.

8. A process of claim 1 wherein the $SO_x$-reducing composition includes at least one material selected from the group consisting of the oxides, hydroxides, and carbonates of an alkali metal or alkaline earth metal.

9. A process according to claim 1 wherein the slurry further contains a composition effective to reduce $NO_x$ within the defined temperature range.

10. A process of claim 9 wherein the $NO_x$-reducing composition comprises urea, ammonium carbonate, ammonium bicarbonate, ammonium carbamate, ammonium hydroxide, or a mixture of any of these in aqueous solution.

11. A process for removing $SO_x$ and particulates from the combustion gases of a combustor, comprising:

preparing a slurry of an alkaline $SO_x$-reducing composition including at least one material selected from the group consisting of the oxides, hydroxides, and carbonates of an alkali metal or alkaline earth metal, effective to reduce $SO_x$ within a defined temperature range of from 900° to 1300° C.

defining a primary treatment zone including at least one treatment zone, having a temperature within the defined temperature range, within the combustor;

introducing the slurry into the combustion gases within the primary treatment zone, the conditions therein being controlled to reduce the $SO_3$ concentration to less than 10 milligram per cubic meter;

cooling the combustion gases, first by steam generating means and then by gas-to-gas heat exchanger;

passing the cooled gases to a secondary treatment zone wherein they are first humidified and further cooled by introduction of water to produce humidified gases, wherein the temperature of the gases is reduced to below 100° C. and the humidity of the gases is increased to within the range of from 75 to 95%;

maintaining contact between the $SO_x$-reducing composition and the humidified gases for a reaction period of at least 2 seconds;

passing the gases through a fabric filter to remove particulate solids and provide contact between the gases and particulate solids held thereon to provide cleaned gases;

recovering solids from the fabric filter at a rate effective to provide capacity for particulates it must separate from the combustion gases; and recycling a portion of the solids recovered to the process to improve utilization of the $SO_x$-reducing composition.

12. A process according to claim 11 wherein the cleaned gases are reheated by the gas-to-gas heat exchanger prior to discharge to the atmosphere.

13. A process according to claim 11 wherein the step of cooling and humidifying the gases to produce humidified gases, reduces the temperature of the gases to from 65° to 80° C. without exceeding the dewpoint of any $SO_3$ therein.

14. A process of claim 11 wherein the composition comprises a stabilizer system comprising a generally, hydrophobic surfactant having an HLB of less than 8 and a more hydrophilic surfactant having an HLB of at least 8, wherein the HLB values of the hydrophobic and the hydrophilic surfactants differ by at least 3, preferably at least 5.

15. A process of claim 11 wherein the $SO_x$-reducing composition comprises a material selected from the group consisting of limestone, dolomite, lime hydrate, and mixtures of these.

16. A process according to claim 11 wherein the slurry further contains a composition effective to reduce $NO_x$ within the defined temperature range.

17. A process of claim 16 wherein the $NO_x$-reducing composition comprises urea, ammonium carbonate, ammonium bicarbonate, ammonium carbamate, ammonium hydroxide, or a mixture of any of these in aqueous solution.

18. A process according to claim 11 wherein fresh slurry comprising $SO_x$-reducing composition is added to the solids recycled.

19. A process according to claim 11 wherein: the $SO_x$-reducing composition comprises a material selected from the group consisting of limestone, dolomite, lime hydrate, and mixtures of these; fresh slurry comprising $SO_x$-reducing composition is added to the solids recycled; and the step of cooling and humidifying the gases to produce humidified gases, reduces the temperature of the gases to from 65° to 80° C. without exceeding the dewpoint of any $SO_3$ therein.

20. A process for removing $SO_x$ and particulates from the combustion gases of a combustor, comprising:

preparing a slurry including (i) an alkaline $SO_x$-reducing composition including at least one material selected from the group consisting of the oxides, hydroxides, and carbonates of an alkali metal or alkaline earth metal, and (ii) a composition effective to reduce $NO_x$ comprising urea, ammonium carbonate, ammonium bicarbonate, ammonium carbamate, ammonium hydroxide, or a mixture of any of these in aqueous solution, said slurry being effective to reduce $SO_x$ and $NO_x$ within a defined temperature range of from 850° to 1100° C.

defining a primary treatment zone including at least one treatment zone, having a temperature within the defined temperature range, within the combustor;

introducing the slurry into the combustion gases within the primary treatment zone, the conditions therein being controlled to reduce the $SO_3$ concentration to less than 10 gram per cubic meter;

cooling the combustion gases, first by steam generating means and then by a gas-to-gas heat exchanger;

passing the cooled gases to a secondary treatment zone wherein they are first humidified and further cooled by introduction of water to produce humidified gases, wherein the temperature of the gases is reduced to below 100° C. and the relative humidity of the gases is increased to within the range of from 50 to 95%;

maintaining contact between the $SO_x$-reducing composition and the humidified gases for a reaction period of at least 2 seconds;

passing the gases through a fabric filter to remove particulate solids and provide contact between the gases and particulate solids held thereon to provide cleaned gases;

recovering solids from the fabric filter at a rate effective to provide capacity for particulates it must separate from the combustion gases; and recycling a portion of the solids recovered to the process to improve utilization of the $SO_x$-reducing composition.

\* \* \* \* \*